(12) United States Patent
Herle et al.

(10) Patent No.: US 11,276,886 B2
(45) Date of Patent: Mar. 15, 2022

(54) SOLID STATE BATTERY FABRICATION

(71) Applicants: Applied Materials, Inc., Santa Clara, CA (US); Ruth M. Gordon, San Jose, CA (US)

(72) Inventors: Subramanya P. Herle, Mountain View, CA (US); Joseph G. Gordon, II, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/774,383

(22) Filed: Jan. 28, 2020

(65) Prior Publication Data
US 2020/0185780 A1    Jun. 11, 2020

Related U.S. Application Data

(63) Continuation of application No. 15/912,179, filed on Mar. 5, 2018, now abandoned, which is a
(Continued)

(51) Int. Cl.
*B29C 65/02* (2006.01)
*C04B 35/01* (2006.01)
(Continued)

(52) U.S. Cl.
CPC ......... *H01M 10/0585* (2013.01); *B29C 65/02* (2013.01); *B32B 18/00* (2013.01);
(Continued)

(58) Field of Classification Search
CPC ...... H01M 4/04; H01M 4/043; H01M 4/8889; H01M 2/14; H01M 2/145; H01M 10/0585;
(Continued)

(56) References Cited

U.S. PATENT DOCUMENTS

| | | |
|---|---|---|
| 5,808,856 A | 9/1998 | Bishoff et al. |
| 2003/0124422 A1 | 7/2003 | Cintra |

(Continued)

FOREIGN PATENT DOCUMENTS

| | | |
|---|---|---|
| CN | 1503385 A | 6/2004 |
| CN | 101313426 A | 11/2008 |

(Continued)

OTHER PUBLICATIONS

Kayama et al., "A lithium superionic conductor" Nature Materials, vol. 10, pp. 682-686, published online Jul. 31, 2011.
(Continued)

*Primary Examiner* — Alex B Efta
(74) *Attorney, Agent, or Firm* — Pillsbury Winthrop Shaw Pittman LLP

(57) ABSTRACT

Embodiments of the invention generally relate to solid state battery structures, such as Li-ion batteries, methods of fabrication and tools for fabricating the batteries. One or more electrodes and the separator may each be cast using a green tape approach wherein a mixture of active material, conductive additive, polymer binder and/or solid electrolyte are molded or extruded in a roll to roll or segmented sheet/disk process to make green tape, green disks or green sheets. A method of fabricating a solid state battery may include: preparing and/or providing a green sheet of positive electrode material; preparing and/or providing a green sheet of separator material; laminating together the green sheet of positive electrode material and the green sheet of separator material to form a laminated green stack; and sintering the laminated green stack to form a sintered stack comprising a positive electrode and a separator.

19 Claims, 3 Drawing Sheets

Related U.S. Application Data continuation of application No. 14/012,041, filed on Aug. 28, 2013, now Pat. No. 9,912,014.

(60) Provisional application No. 61/694,198, filed on Aug. 28, 2012.

(51) Int. Cl.

| | | |
|---|---|---|
| *C04B 35/52* | (2006.01) | |
| *B32B 18/00* | (2006.01) | |
| *C04B 37/00* | (2006.01) | |
| *H01M 10/04* | (2006.01) | |
| *H01M 10/054* | (2010.01) | |
| *H01M 10/0585* | (2010.01) | |
| *H01M 10/14* | (2006.01) | |
| *H01M 10/052* | (2010.01) | |
| *H01M 10/0562* | (2010.01) | |
| *H01M 4/04* | (2006.01) | |

(52) U.S. Cl.
CPC ............ *C04B 35/01* (2013.01); *C04B 35/52* (2013.01); *C04B 37/00* (2013.01); *C04B 37/001* (2013.01); *C04B 37/003* (2013.01); *H01M 10/0413* (2013.01); *H01M 10/0436* (2013.01); *H01M 10/052* (2013.01); *H01M 10/054* (2013.01); *H01M 10/0562* (2013.01); *H01M 10/14* (2013.01); *C04B 2235/3203* (2013.01); *C04B 2237/08* (2013.01); *C04B 2237/16* (2013.01); *H01M 4/0471* (2013.01); *H01M 10/0468* (2013.01); *H01M 2300/0071* (2013.01); *Y02E 60/10* (2013.01); *Y02P 70/50* (2015.11); *Y02T 10/70* (2013.01)

(58) Field of Classification Search
CPC ........... H01M 10/0413; H01M 10/052; H01M 10/0562; H01M 10/054; H01M 10/14; C04B 37/00; C04B 37/001; C04B 37/003; C04B 37/005; C04B 37/006; C04B 2237/08; C04B 2237/16; C04B 2235/3203
See application file for complete search history.

(56) References Cited

U.S. PATENT DOCUMENTS

| | | | |
|---|---|---|---|
| 2004/0010909 A1 | 1/2004 | Emanuel et al. | |
| 2004/0101753 A1 | 5/2004 | Hwang | |
| 2004/0126653 A1 | 7/2004 | Msco et al. | |
| 2007/0037058 A1 | 2/2007 | Msco et al. | |
| 2007/0175020 A1 | 8/2007 | Nagata et al. | |
| 2007/0259271 A1* | 11/2007 | Nanno | H01M 4/483 429/318 |
| 2008/0246194 A1 | 10/2008 | Ito et al. | |
| 2008/0311480 A1 | 12/2008 | Sano | |
| 2009/0081554 A1 | 3/2009 | Takada | |
| 2009/0092903 A1 | 4/2009 | Johnson | |
| 2009/0193648 A1 | 8/2009 | Inda | |
| 2009/0197178 A1* | 8/2009 | Inda | H01M 4/13 429/231.95 |
| 2009/0197183 A1 | 8/2009 | Kato | |
| 2009/0246636 A1 | 10/2009 | Chiang et al. | |
| 2010/0159325 A1 | 6/2010 | Sugiura et al. | |
| 2010/0273056 A1* | 10/2010 | Kanda | H01M 10/0562 429/223 |
| 2011/0053001 A1 | 3/2011 | Babic | |
| 2011/0053002 A1 | 3/2011 | Yamamura et al. | |
| 2011/0065006 A1* | 3/2011 | Ogasa | H01M 4/5825 429/319 |
| 2011/0244337 A1 | 10/2011 | Ohta | |
| 2012/0115039 A1 | 5/2012 | Ouchi et al. | |
| 2013/0209873 A1* | 8/2013 | Nagasaka | H01M 4/0409 429/209 |
| 2013/0244108 A1 | 9/2013 | Hayashi et al. | |

FOREIGN PATENT DOCUMENTS

| | | | | |
|---|---|---|---|---|
| CN | 102027626 A | 4/2011 | | |
| CN | 102171863 A | 8/2011 | | |
| JP | 2006-503416 A | 1/2006 | | |
| JP | 2007-005279 A | 1/2007 | | |
| JP | 2009-206090 A | 9/2009 | | |
| JP | 2009-277381 A | 11/2009 | | |
| JP | 2010-015782 A | 1/2010 | | |
| JP | 2010-135090 A | 6/2010 | | |
| JP | 2010272344 A | 12/2010 | | |
| JP | 2011-073962 A | 4/2011 | | |
| JP | 2011081915 A | 4/2011 | | |
| JP | 2011-134617 A | 7/2011 | | |
| JP | 2011-165410 A | 8/2011 | | |
| WO | 2012035211 A | 3/2012 | | |
| WO | 2012053359 A1 | 4/2012 | | |
| WO | WO-2012053359 A1 * | 4/2012 | ............ | H01M 50/46 |
| WO | 2012060350 | 5/2012 | | |
| WO | 2011132627 A | 7/2013 | | |

OTHER PUBLICATIONS

Murugan et al., "Fast Lithium Ion Conduction in Garnet-Tpe Li7La3Zr2O12," Angew. Chem. Int. Ed. (2007), ed. 46, pp. 7778-7781.

International Search Report and Written Opinion dated Dec. 6, 2013 for PCT/US2013/056998.

Masquelier, C., "Lithium ions on the fast track," Nature Materials, vol. 10, Sep. 2011, pp. 649-650.

Lethien, C., et al., "Micro-patterning of LiPON and lithium iron phosphate material deposited onto silicon nanopillars array for lithium ion solid state 3D micro-battery," Microelectron. Eng. (2011), doi: 10.1016/j. mee.2011.06.022, 6 pages.

Bagetto, L., et al., R.A.H. & Notten, P.H.L. Eindhoven, NL, "On the route toward 3D-integrated all-solid-state micro-batteries," Solid State Technology, Aug. 2008, vol. 51, No. 8, pp. 30-35.

Patent Cooperation Treaty, International Search Report and Written Opinion issued for PCT/US2013/056998, dated Dec. 6, 2013, pp. 1-.

Japanese Intellectual Property Office, Official Action issued in JP Patent Application No. 2019-017932, dated Mar. 2, 2021, pp. 1-5.

* cited by examiner

SOLID STATE BATTERY FABRICATION

CROSS-REFERENCE TO RELATED APPLICATIONS

This application is a continuation of U.S. application Ser. No. 15/912,179, filed Mar. 5, 2018, which is a continuation of U.S. application Ser. No. 14/012,041, filed Aug. 28, 2013, which claims the benefit of U.S. Provisional Application No. 61/694,198 filed Aug. 28, 2012, all of which are incorporated herein by reference in their entirety.

FIELD OF THE INVENTION

Embodiments of the present invention relate generally to Li-ion batteries and more specifically to solid state Li-ion batteries fabricated using a "green tape" lamination and sintering process to form the positive electrode, separator and negative electrode stack.

BACKGROUND OF THE INVENTION

The current generation of Li-ion batteries use liquid electrolyte; although, from a safety perspective a solid state electrolyte would be preferred. The current generation of Li-ion batteries consist of a positive electrode and a negative electrode separated by a porous separator and liquid electrolyte used as the ionic conductive matrix. In these Li-ion batteries, the liquid electrolyte represents a safety hazard because it is flammable and reacts with the other cell components. Shorting of the negative electrode to the positive electrode can cause a fire. Shorts may be caused by one or more of: (a) conductive asperities or particles in the cell which are introduced during manufacturing; (b) dendrites that grow from one electrode to the other during operation of the cell; and (c) shrinking of the separator due to overheating. To prevent shorts, cells are currently designed with thick, strong separators that may incorporate advanced structures—for example, separators impregnated or coated with ceramic nano-particles. Also, reactions between the electrolytes and the other active materials in the cell can result in nominally identical cells having different rates of capacity aging. This makes series stacking difficult as the imbalance reduces the available capacity of the series stack and can result in safety issues—for example, over charging of some cells in the battery due to stacking of cells with different capacities may cause premature failure or thermal runaway of overcharged cells. These potential problems are addressed in today's batteries as follows: (1) by incorporating safety elements in the cells—pressure release vents and switches, and PTC (positive temperature coefficient) current limiters; (2) monitoring the battery pack by the battery pack electronics—e.g. monitoring temperature, voltage of each cell or parallel set, total stack voltage and total pack current; and (3) by using protective battery enclosures and, sometimes, active cooling. All of these measures add expense and reduce the energy density at the cell and pack level.

There is a need for Li-ion batteries with nonflammable solid state electrolytes that can avoid the aforementioned problems associated with today's liquid electrolyte cells.

SUMMARY OF THE INVENTION

Embodiments of the invention generally relate to solid state battery structures, such as Li-ion batteries, methods of fabrication and tools for fabricating the batteries. One or more electrodes and the separator may each be cast using a green tape approach wherein a mixture of active material, conductive additive, polymer binder and/or solid electrolyte are molded or extruded in a roll to roll or segmented sheet/disk process to make green tape, green disks or green sheets. The fabrication method for the solid state batteries of the present invention may include lamination and sintering of the green tape/disk/sheet separator and electrode(s). Embodiments of this method are expected to be scalable and cost effective—suitable for high volume manufacturing.

According to some embodiments of the present invention, a method of fabricating a solid state battery may include: preparing and/or providing a green sheet of positive electrode material; preparing and/or providing a green sheet of separator material; laminating together the green sheet of positive electrode material and the green sheet of separator material to form a laminated green stack; and sintering the laminated green stack to form a sintered stack comprising a positive electrode and a separator. The method may further comprise laminating a green sheet of negative electrode material to the green sheet of separator material, wherein the laminated green stack further comprises the green sheet of negative electrode material with the green sheet of separator material in between the green sheet of positive electrode material and the green sheet of negative electrode material, and wherein the sintered stack further comprises a negative electrode with the separator in between the positive electrode and the negative electrode. Alternative embodiments may include laminating a negative electrode, such as a lithium electrode, to the sintered stack. Furthermore, current collector(s) may be deposited on the surface of the positive electrode and in embodiments on the surface of the negative electrode. In embodiments the green sheet of positive electrode material may comprise a Li(Mn,Co,Ni)O$_2$ material and a binding polymer. In embodiments the green sheet of separator material may comprise a pure ion conductor material, such as Li$_{7-x}$La$_3$Zr$_{2-x}$Ta$_x$O$_{12}$ where 0≤x≤1, and a polymer binder. In embodiments the green sheet of negative electrode material may comprise a Li$_4$Ti$_5$O$_{12}$ material and/or a graphite material and a polymer binder.

According to further embodiments, process systems are configured for fabricating solid state batteries according to methods described herein.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
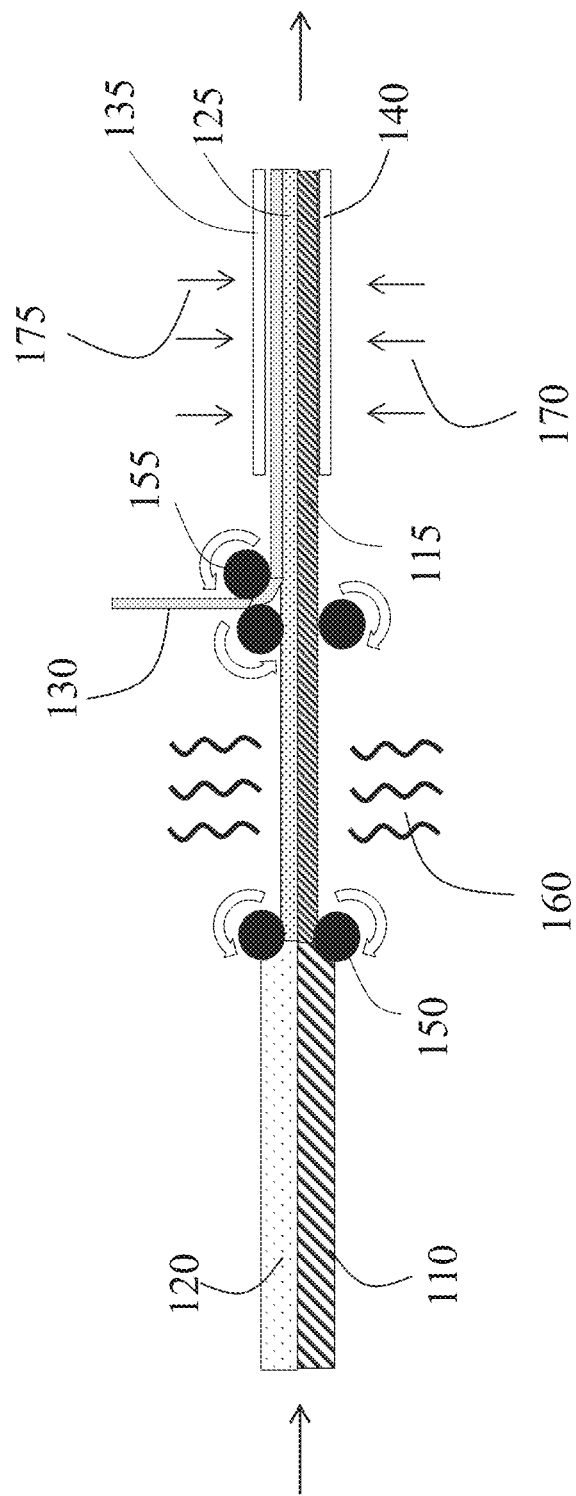
FIG. 1 is a schematic representation of a solid state battery fabrication process, according to some embodiments of the present invention.
Figure 2:
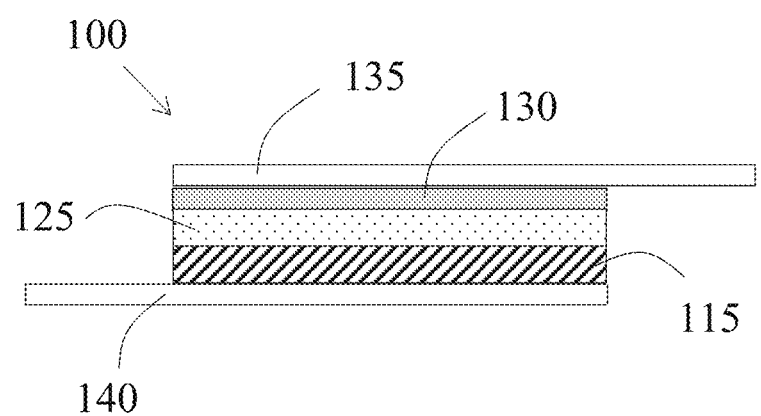
FIG. 2 is a cross-sectional representation of a solid state battery cell, according to some embodiments of the present invention.
Figure 3:
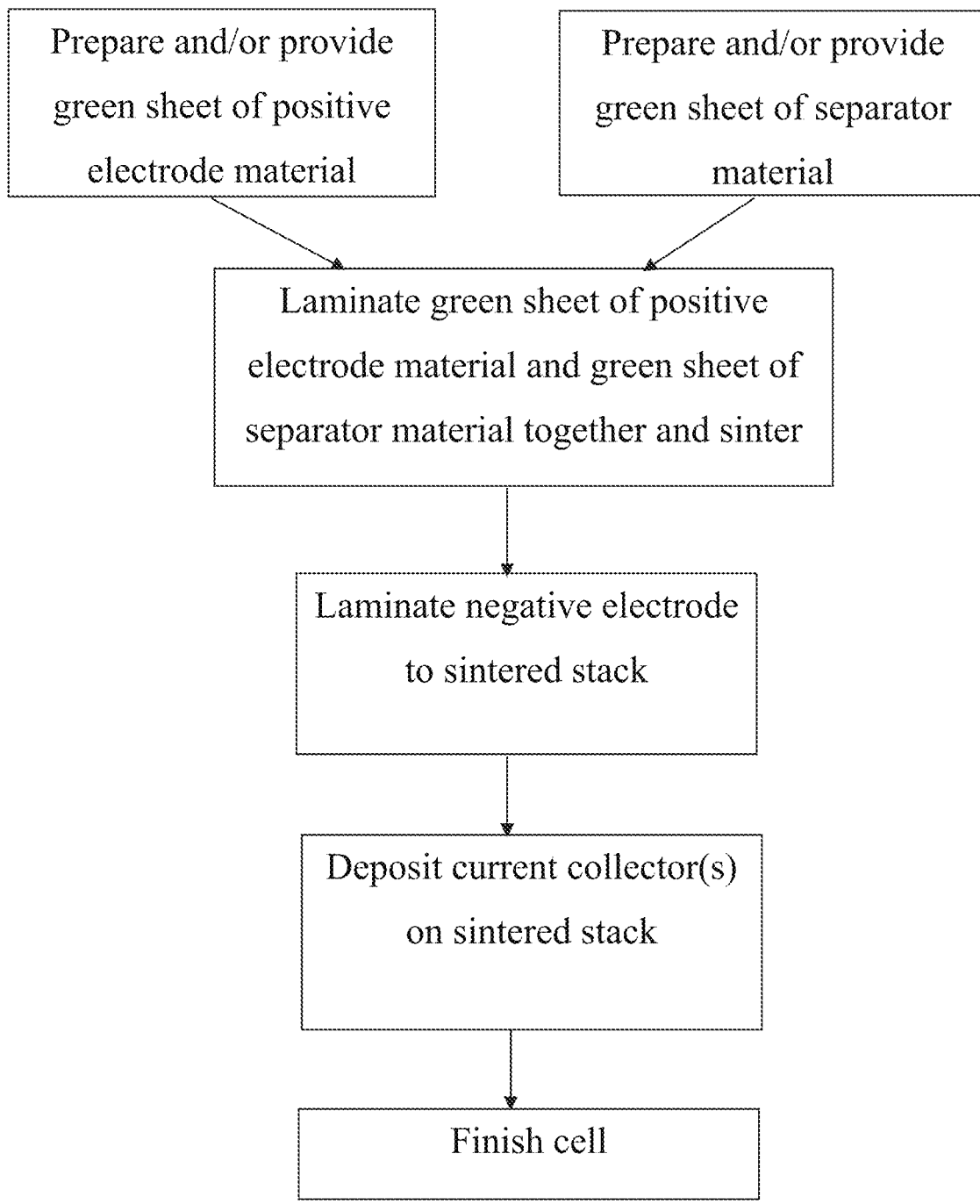
FIG. 3 is a process flow for forming a solid state battery, according to some embodiments of the present invention.

FIGS. 1-3 show solid state battery structures, methods and fabrication systems according to some embodiments of the present invention. A cross-sectional representation of an example of a solid state cell 100 is shown in FIG. 2, with a positive current collector 140, a positive electrode 115, a solid electrolyte separator 125, a negative electrode 130 and a negative current collector 135. Note in FIG. 2 that the current collectors are shown to extend beyond the stack, although it is not necessary for the current collectors to extend beyond the stack, the portions extending beyond the stack may be used as tabs. The current collectors 140, 135, on positive and negative electrodes, respectively, can be identical or different electronic conductors. The current collectors can be deposited or can use pre-existing conductive materials as carrier substrates for the green tape—example materials for current collectors are copper, aluminum, carbon, nickel, metal alloys, etc. Furthermore, current collectors may be of any form factor, shape and micro/macro structure. Generally, in prismatic cells, tabs are formed of the same material as the current collector and may be formed during fabrication of the stack, or added later. The positive electrode 115 and separator 125 are formed from "green tape", laminated together and then sintered before adding the negative electrode 130 and current collector 140. Furthermore, in some embodiments of the present invention the negative electrode may also be formed from "green tape" which is laminated with the separator and positive electrode "green tapes", and then all are sintered together. Note that depending on the negative electrode, a negative electrode current collector 135 may or may not be needed, as explained herein.

One or more electrodes and the separator can be cast using a green sheet/green disk/green tape approach wherein a mixture of active material, conductive additive, polymer binder and/or solid electrolyte are molded or extruded in a roll to roll or segmented sheet/disk process to make green tape, green disks or green sheets. Fabrication of a cell or battery consists of forming a stack of green sheets of a positive electrode (for example, Li(Mn,Co,Ni)$O_2$ material) and a separator (for example, $Li_{7-x}La_3Zr_{2-x}Ta_xO_{12}$ where x=0 to 1), and then heating to remove the binder, sinter and densify the active materials. Furthermore, a green sheet of a negative electrode (for example, $Li_4Ti_5O_{12}$) may be added to the stack and thermally processed with the other green sheets. To densify the electrodes or electrode stacks one can employ combinations of pressure, temperature, and vibration techniques under a variety of atmospheric conditions. Heating can be by oven or radiant energy. If needed to enhance the electrochemical contact between the positive/negative active material and the electrolyte/s, suitable interface engineering can be performed to reduce the overall cell impedance.

Examples of solid electrolytes that are mixed with active materials (e.g., $LiCoO_2$) in the green tape (and will generally be present in the same crystalline form in the sintered separator) are doped variants of $Li_7La_3Zr_2O_{12}$ (LLZO) garnet or sulphide based ($Li_2S/P_2S_5$ type) electrolytes, such as $Li_{10}GeP_2S_{12}$. Suitable materials for the negative electrode may be Li metal, graphite and $Li_4Ti_5O_{12}$. Suitable materials for the positive electrode may be $LiMn_{1.5}Ni_{0.5}O_4$, Li(Ni,Mn,Co)$O_2$ and $Li_2S/CuS_x$. Furthermore, mixed ionic and electronic conductors such as (Li,La)$TiO_3$ may also be used in the electrodes, but not the separator.

Component materials for a positive electrode "green" tape may include: a positive active material, such as $LiCoO_2$; a polymer for thick film ceramic compositions to bond the particles together, such as poly-acrylonitrile, various MCMs (Microcircuit Materials) and/or other LTCC (low temperature co-fired ceramic) materials, available from E. I. du Pont de Nemours and Company, for example; and, optionally one or more of an electronic conductive additive such as carbon nano-tubes, VGCF (vapor grown carbon nano-fiber), carbon black, etc., a mixed ionic and electronic conductor such as Li doped $LaTiO_3$, and a pure ionic conductive additive such as $Li_{7-x}La_3Zr_{2-x}Ta_xO_{12}$ where x=0 to 1.

Component materials for a negative electrode "green" tape may include: a negative active material, such as $Li_4Ti_5O_{12}$; a polymer for thick film compositions to bond the particles together, such as described above; and optionally, one or more of an electronic conductive additive such as carbon nano-tubes, a mixed ionic and electronic conductor such as Li doped $LaTiO_3$, and a pure ionic conductive additive such as $Li_{7-x}La_3Zr_{2-x}Ta_xO_{12}$ where x=0 to 1. Note that use of mixed ionic and electronic conductors may reduce the amount of conductive additive need in the green tape. Furthermore, instead of $Li_4Ti_5O_{12}$ negative active material, a more conductive graphite can be used as negative active material and the amount of conductive additives, such as carbon nanotubes, VGCF (vapor grown carbon nano-fiber), carbon black, etc. can be decreased.

Component materials for a separator "green" tape may include: a pure ion conductor such as $Li_{7-x}La_3Zr_{2-x}Ta_xO_{12}$ where x=0 to 1; and a polymer for thick film compositions to bond the particles together, such as described above.

A good interface between the solid electrolyte and the active materials within the separator may be desirable; herein a good interface is an interface which will not increase the cell impedance (ions can easily move across active material/solid electrolyte boundary). Furthermore, the solid electrolyte and active materials may be chosen to have similar or low volume changes during cell charge/discharge cycles. To reduce the interface resistance, surface functional groups or groups of molecules can be included at the interface between the active materials and solid electrolyte. Radiant heating from sources such as heating rods, lamps, lasers and microwaves, electrical heating, such as inductive eddy current and resistance heating, and heating by ultasonic vibration, etc. may be effective processes for supplying the energy needed to integrate and densify the materials and yet avoid chemical and/or structural changes to the materials that may compromise battery performance. Furthermore, materials may be added to protect against deleterious chemical and/or structural changes to the materials, for example an all solid state cell using a lithium conducting solid electrolyte, $Li_{10}GeP_2S_{12}$, and a thin layer of $LiNbO_3$ coated on LiCoO$_2$ active material to prevent unwanted side reactions. See Kamaya et. al., Nat. Mater. 2011, 10 (9), 682-686.

Depending on the specific combination of materials, the average voltage of a fully charged cell may be engineered by suitable choice of negative and positive active materials, and cells may be connected in series to achieve higher voltages from the battery. By using the solid electrolyte, one can save cell packaging space by eliminating un-needed safety components and by eliminating connectors by stacking cells in series. The latter also reduces the required thickness of current collectors and can permit greater than 80% of the cell components to be active material. Note that by stacking the cells with the negative current collector in contact with the positive current collector of the adjacent cell, a series connection can be achieved without having to connect wiring to a tab, thus eliminating both the tabbing operation and the wiring operation. In a conventional liquid electrolyte cell this is a dangerous practice since mismatch in the capacities of the cells connected in series can lead to over-charge or over-discharge of an individual cell with consequential failure, sometimes with expulsion of liquid electrolyte and fire. However, the nonflammable solid electrolyte eliminates this dangerous failure mode (but not the failure).

FIG. 1 shows a schematic representation of an example of a fabrication process for a solid state battery according to some embodiments of the present invention. The example in FIG. 1 is applicable to a continuous process, such as a roll-to-roll process, and also to a serial process for green sheets or green disks. Green sheets for the positive electrode 110 and the separator 120 are prepared and are then laminated together using pinch rollers 150. Pinch rollers 150 are heated. After lamination, the green sheets stack is heated in a furnace 160, to form a sintered stack of positive electrode 115 and separator 125. Note, if needed to keep the stack flat during thermal processing, pressure may be applied using a heated roller (not shown in figures) situated in furnace 160. The gas environment in the furnace 160 may need a sufficiently high oxygen partial pressure to keep the metals in the solid electrolyte in their desired oxidation states and also to remove carbonaceous materials from the green tape. The furnace 160 can be heated using one or more of conventional convection, radiation sources such as IR lamps, laser heating, etc. The heating may be conducted while the green tape is under pressure in order to increase the electrode density and reduce the interfacial impedance between the electrolyte and the active material. A negative electrode 130 is laminated to the sintered stack using pinch rollers 155—an example of a suitable negative electrode for this process being a Li metal film. Note that a dry air environment will be needed for fabrication should a Li metal electrode be used. The interface between a metallic lithium negative electrode and a solid electrolyte may include a thin layer of Si, Cu$_3$N, or Li$_{3-x}$PO$_{4-y}$N$_y$ to avoid reduction of metals in the solid electrolyte at lower potentials than desired and also for reducing interface impedance. Furthermore, a carbon or other lithium intercalating or alloying material may be utilized for the negative electrode. A current collector 140 may be deposited on the surface of the positive electrode 115—for example PVD deposition 170 of aluminum metal. Furthermore, should a negative electrode such as a carbon electrode be used, then a negative electrode current collector 135 may also be needed—the current collector 135 is deposited on the surface of the negative electrode 130, using a PVD deposition 175 of copper metal, for example. Attaching tabs, and sealing or encapsulation steps complete the fabrication process. However, when a continuous roll-to-roll process is used the stack may be cut to form individual cells—mechanical cutting, scribe and fracture, laser cutting, etc., processes might be used, providing the processes do not smear cell edges and/or cause shorting of electrodes.

An example process flow for the fabrication of a solid state battery according to some embodiments of the present invention is provided in FIG. 3. A green sheet of positive electrode material is prepared. A green sheet of separator material is prepared. The green sheet of positive electrode material and the green sheet of separator material are laminated together and sintered. A negative electrode is laminated to the sintered stack. A current collector is deposited on the surface of the positive electrode. Furthermore, a current collector may also be needed to be deposited on the negative electrode, for example when activated graphite material is used as the negative electrode; although, if lithium metal is used for the negative electrode, a current collector may not be needed. Cells and batteries are finished, as described above.

Furthermore, as an alternative to laminating a negative electrode to the sintered stack comprising a separator and a positive electrode, as shown in FIGS. 1 and 3, in some embodiments a method of fabricating a solid state battery may include laminating together a green sheet of positive electrode material, a green sheet of negative electrode material and a green sheet of separator material, wherein the green sheet of separator material is in between the green sheet of negative electrode material and the green sheet of positive electrode material, wherein the laminated green stack will then comprise the green sheet of positive electrode material and the green sheet of negative electrode material with the green sheet of separator material in between, and wherein the sintered stack will comprise the positive electrode and the negative electrode with the separator in between.

The solid state electrochemical cells of the present invention may typically range in thickness between 10 and 500 microns, where, for example, the positive and negative electrodes are each 10 to 150 microns, the separator is 3 to 25 microns, and the current collector(s) are each 1 to 50 microns.

As shown schematically in FIG. 1, and described above, in embodiments an in-line process system for fabricating a solid state battery may comprise: a first lamination system configured to laminate together a green sheet of positive electrode material and a green sheet of separator material to form a laminated green stack; a sintering system configured to sinter the laminated green stack to form a sintered stack comprising a positive electrode and a separator; and a first deposition system configured to deposit a positive current collector on the surface of the positive electrode. Furthermore, the in-line process system may comprise a second lamination system for laminating a negative electrode to the separator. Yet furthermore, the in-line process system may be a roll-to-roll process system. Furthermore, the in-line process system may further comprise a second deposition system configured to deposit a negative current collector on the surface of the negative electrode.

Furthermore, in some embodiments an in-line process system for fabricating a solid state battery may comprise: a lamination system configured to laminate together a green sheet of positive electrode material, a green sheet of negative electrode material and a green sheet of separator material, wherein the green sheet of separator material is in between the green sheet of negative electrode material and the green sheet of positive electrode material, to form a laminated green stack; a sintering system configured to sinter the laminated green stack to form a sintered stack comprising a positive electrode, a separator and a negative electrode; and a first deposition system configured to deposit a positive current collector on the surface of the positive electrode. Furthermore, the in-line process system may be a roll-to-roll process system. Yet furthermore, the in-line process system may further comprise a second deposition system configured to deposit a negative current collector on the surface of the negative electrode.

Some potential advantages of the all solid state battery include increased safety of cells and high volumetric energy density, when compared with the current liquid electrolyte Li-ion batteries. The all solid state batteries are expected to be suitable for use in portable electronics, power tools, medical devices, sensors, electric vehicles and may also be used in other energy storage applications.

Although the present invention has been described with reference to Li-ion batteries, other solid state batteries may also be fabricated using the teaching and principles of the present invention.

Although the present invention has been particularly described with reference to certain embodiments thereof, it should be readily apparent to those of ordinary skill in the art that changes and modifications in the form and details may be made without departing from the spirit and scope of the invention.

What is claimed is:

1. An in-line method for fabricating a solid state battery, the method comprising:
    laminating together (i) a green sheet of positive electrode material comprising a positive active material and one of a pure ionic conductor and a mixed ionic and electronic conductor to form a positive electrode, and (ii) a green sheet of separator material comprising a solid electrolyte that is a pure ionic conductor that does not include a mixed ionic and electronic conductor to form a separator;
    sintering the laminated stack of green sheets to form a sintered stack comprising the positive electrode and the separator;
    laminating together a negative electrode comprising a green sheet of negative electrode material and the sintered stack of the positive electrode and the separator to form a laminated stack, wherein the sintered stack of the positive electrode and the separator are laminated with the negative electrode material such that the separator material is disposed between the negative electrode material and the positive electrode material; and
    depositing a positive current collector on a surface of the positive electrode and a negative current collector on a surface of the negative electrode; and
    arranging the laminated stack with other stacks in a configuration wherein a negative current collector of a solid state battery cell contacts a positive current collector of an adjacent solid state battery cell to achieve a series electrical connection without requiring performance of wiring operations.

2. The in-line method of claim 1 wherein the green sheet of positive electrode material and the green sheet of negative electrode material are a segmented sheets.

3. The in-line method of claim 1 wherein pinch rollers are used for laminating together the negative electrode and the sintered stack of the positive electrode and the separator.

4. The in-line method of claim 1 wherein sintering the laminated stack of green sheets includes heating the green sheets under pressure.

5. The in-line method of claim 1 wherein sintering the laminated stack of green sheets is performed in a gas environment comprising high oxygen partial pressure to keep metals in the solid electrolyte in an oxidation state.

6. The in-line method of claim 1 further comprising incorporating a layer of silicon or copper nitride at an interface between the negative electrode and the sintered stack of the positive electrode and the separator.

7. The in-line method of claim 1 wherein one or more of the green sheet of positive electrode material, the green sheet of negative electrode material, and the green sheet of separator material include a polymer binder for thick film compositions.

8. The in-line method of claim 1 wherein one or more of the green sheet of positive electrode material and the green sheet of negative electrode material further comprises an electronic conductive additive.

9. The in-line method of claim 8 wherein the electronic conductive additive comprises one or more of carbon nanotubes, vapor grown carbon nanofibers, or carbon black.

10. An in-line process system for fabricating a solid state battery comprising:
    a first lamination system configured to laminate together (i) a green sheet of positive electrode material comprising a positive active material and one of a pure ionic conductor and mixed iconic and electronic conductor and (ii) a green sheet of separator material comprising a solid electrolyte that is a pure ionic conductor that does not include a mixed ionic and electronic conductor to form a separator;
    a sintering furnace configured to sinter the laminated stack of green sheets to form a sintered stack comprising the positive electrode and the separator;
    a second lamination system for laminating together a negative electrode comprising a green sheet of negative electrode material and the sintered stack of the positive electrode and the separator to form a laminated stack, wherein the sintered stack of the positive electrode and the separator are laminated with the negative electrode material green sheet of negative electrode material, and the green sheet of separator material are laminated together such that the separator material is disposed between the negative electrode material and the positive electrode material; and
    a physical vapor deposition system for depositing a positive current collector on a surface of the positive electrode and a negative current collector on a surface of the negative electrode,
    wherein the laminated stack is arranged with other stacks in a configuration wherein a negative current collector of a solid state battery cell contacts a positive current collector of an adjacent solid state battery cell to achieve a series electrical connection without requiring performance of wiring operations.

11. The in-line process system as in claim 10 further comprising a roll-to-roll process system.

12. The in-line process system as in claim 10, wherein the second lamination system comprises pinch rollers for laminating the negative electrode to the sintered stack.

13. The in-line process system as in claim 10 wherein the green sheet of positive electrode material and the green sheet of separator material are segmented sheets.

14. The in-line process system as in claim 10 wherein the sintering furnace is configured to sinter the green sheet of positive electrode material and the green sheet of separator material by heating them under pressure.

15. The in-line process system as in claim 10 wherein the sintering furnace is configured to perform the sintering in a gas environment comprising high oxygen partial pressure to keep metals in the solid electrolyte in a desired oxidation state.

16. The in-line process system as in claim 10 wherein a layer of silicon or copper nitride is incorporated at an interface between the negative electrode and the sintered stack of the positive electrode and the separator.

17. The in-line process system as in claim 10 wherein one or more of the green sheet of positive electrode material, the green sheet of negative electrode material, and the green sheet of separator material include a polymer binder for thick film compositions.

18. The in-line process system as in claim 10 wherein one or more of the green sheet of positive electrode material and the green sheet of negative electrode material further comprise an electronic conductive additive.

19. The in-line process system as in claim 18 wherein the electronic conductive additive comprises one or more of carbon nanotubes, vapor grown carbon nanofibers, or carbon black.

* * * * *